Patented Aug. 8, 1950

2,517,570

UNITED STATES PATENT OFFICE 2,517,570

METHOD OF DIMENSIONALLY STABILIZING ORIENTED VINYLIDENE CHLORIDE POLYMER ARTICLES

Carroll R. Irons, Midland, Mich., assignor to The Dow Chemical Company, Midland, Mich., a corporation of Delaware No Drawing. Application January 23, 1946, Serial No. 643,001

3 Claims. (Cl. 18—48)

This invention relates to a process for treating oriented films and filaments of crystalline polymers, substantially to eliminate their tendency to shrink, wrinkle or curl when heated, and to the product thereby obtained. It relates in particular to such a method applied to films of crystalline vinylidene chloride-vinyl chloride copolymers, and especially a copolymeric film of from about 88 to about 93 per cent vinylidene chloride and complementarily from about 7 to 12 per cent of vinyl chloride.

In the past several years numerous patents and other publications have described the normally crystalline vinylidene chloride copolymers. It has thus become known that one of the principal such copolymers contains within a few per cent of 90 per cent vinylidene chloride, the balance being vinyl chloride; that such high-vinylidene chloride copolymers are crystalline, as shown by X-ray diffraction patterns; that they may be fused, supercooled, and cold-worked, as by stretching, to form oriented crystalline articles of high tensile strength; and, that oriented crystalline films of the vinylidene chloride-vinyl chloride copolymer have wide utility in the industrial arts.

It has been found that films and filaments of the herein-concerned copolymer are caused to shrink when warmed to temperatures above 60° C., even for short periods, and that they shrink more gradually when held for prolonged periods at temperatures as low as room temperature. Since there are many uses for strong films in which it may be necessary to encounter temperatures at which shrinkage might occur in the "as made" condition of these films, and since such shrinkage results in unsightly wrinkles, due to non-uniform stresses in different directions across the film, it has become necessary to seek a means for overcoming these and associated disadvantages.

It is accordingly among the objects of the present invention to provide a method whereby an oriented crystalline film or filament of high vinylidene chloride-balance vinyl chloride copolymer may be made substantially resistant to dimensional changes at temperatures up to 100° C., or higher. A related object is to provide a method whereby an oriented crystalline polymeric film may be treated to eliminate or minimize original inequalities in its internal stresses, and to yield a dimensionally stable, wrinkle-free oriented film. A particular object is to provide a method whereby a stretched and oriented film of a crystalline vinylidene chloride-vinyl chloride copolymer may be treated so that, when heated for 30 minutes at 100° C., it will exhibit a shrinkage of not more than about 1.5 per cent. Another object is to provide an oriented crystalline film of the said copolymer which is dimensionally stable at temperatures up to 100° C., which remains wrinkle-free when heated to such temperatures, and which retains the strength and other desirable properties of the original film. Related objects may become apparent as the description proceeds.

In a concurrently filed application of Robert D. Lowry and Hugo L. Schaefer, Serial No. 643,000, there is disclosed a method whereby substantial improvement may be obtained in films of crystalline vinylidene chloride-vinyl chloride copolymers, comprising heating the film for from 10 to 150 seconds at a temperature between 125° C. and 10 degrees below the softening point, while holding the film so as to permit at least 10 and to prevent more than 70 per cent of the shrinkage which the same film exhibits when heated under the same conditions of time and temperature but without restraint, and cooling the film while restrained against change of shape and dimension.

In accordance with the present invention, which is an improvement over that disclosed in said concurrently filed application of Lowry and Schaefer, the foregoing and related objects are attained in a multiple step treatment comprising heating the film for from 30 to 120 seconds at a film temperature of from 130° to 150° C., i. e. from 20 to 40 degrees below the softening point, while holding the film securely to prevent shrinkage, releasing the tension sufficiently to permit slippage but insufficiently to permit wrinkle formation while heating for an additional 30 to 120 seconds at a temperature between 100° C. and 20 degrees below the temperature used in the first treatment, then cooling the film while under tension, at least to 100° C., and releasing the tension. The so treated film has a residual shrinkage of 1.5 per cent or less, when heated in an unrestrained condition at 100° C. for 30 minutes. No significant amount of shrinkage is ever obtained with a film which has been treated in this manner at any of the temperatures normally encountered by packaged goods in transit or storage. Because of the complete redistribution of internal stresses during treatment, the film remains wrinkle-free at all temperatures up to a few degrees below that used in the final step in the treating process.

Indicative of the extent of the shrinkage problem, the following table presents data respecting the unrestrained shrinkage of average films composed of a 90 per cent vinylidene chloride-10 per cent vinyl chloride copolymer, plasticized with 7 per cent of its weight of di-(alpha-phenylethyl)-ether. The films were 2 mils thick, and during their manufacture from an extruded and supercooled tube, had been stretched longitudinally about three-fold while being expanded radially about four-fold. The composition of the so-oriented, crystalline films had a softening point of about 170° C. At temperatures above 100° C., no noticeable difference in shrinkage was obtained when exposure times were varied from as little as 10 seconds to as much as a week, and at all temperatures above 50° C., shrinkage of unrestrained film was complete in about 2.5 minutes. The film had been stored, since its manufacture, on a tightly wound reel which prevented longitudinal shrinkage but which may have permitted some slight transverse shrinkage, and for this reason the heat treatment resulted in a greater apparent longitudinal change than the one in the transverse direction.

| Temperature, °C. | Time, Seconds | Average Shrinkage, Longitudinal | Per Cent Transverse |
| --- | --- | --- | --- |
| 40 | 150 | 0.1 | 0.1 |
| 60 | 150 | 3.5 | 2.5 |
| 80 | 150 | 8.8 | 6.4 |
| 100 | 150 | 16 | 12 |
| 120 | 10 | 25 | 21 |
| 130 | 10 | 31 | 27 |
| 140 | 10 | 40 | 35 |
| 150 | 10 | 50 | 46 |
| 160 | 10 | ¹ 60 | ¹ 60 |

¹ Approximately.

In the tests reported in the preceding table it was found that the heated and shrunken films no longer had the desirable attributes of oriented crystallinity. The films were still crystalline, but the arrangement was essentially random. It is presumed that the treatment of the unrestrained film caused such complete relaxation of the internal stresses as to permit some of the submicroscopic crystallites to become upended, i. e., to become vertical to the plane of the film, and thus to weaken it. The normal position of the crystallites in the oriented film is presumed to be in layers parallel to the surface of the film. This has sometimes been called "planar orientation."

There has now been found a set of conditions of treatment, constituting the method of the present invention, whereby the disadvantages inherent both in heating unrestrained film and in confining a treatment to the heating of fully restrained film can be and are avoided. In the new method, the film to be treated is first held securely around its periphery, with no slack, and heated for from ½ to 2 minutes at a film temperature between 130° and 150° C. while the tension is maintained to prevent dimensional change. Tension is then released sufficiently to permit the film to slip and shrink, but not enough to permit it to wrinkle, while it is heated for another period of ½ to 2 minutes at a temperature at least 20 degrees lower than that first employed, but not below 100° C. The second stage heating temperature should preferably be from 10 to 20 degrees, or more, above the desired temperature of stability, as well as the stated 20 degrees or more below the first stage temperature. During this second stage, the internal stresses are substantially redistributed, and some shrinkage occurs, which is usually from 2 to 6 per cent of the dimensions of the original film. Retention of sufficient tension on the film to prevent wrinkling, during the second heating operation, assures continued planar orientation of the crystallites and retention of the characteristic high strength values in the film. While it is still held in a wrinkle-free position, the film is cooled, at least to a temperature below 100° C. The edges of the film, which were clamped during the heat treatment, are usually removed by trimming, and a wrinkle-free, non-shrinking film is obtained. Under the recited conditions of treatment there is consistently obtained a film having residual shrinkage values below 1.5 per cent, and commonly near or below 1 per cent, as may be determined by heating unrestrained samples of such films at 100° C. in air for 30 minutes.

When the temperatures employed in the first stage are below 130° C. in operations on crystalline vinylidene chloride-vinyl chloride copolymer films, the complete process gives films with greater residual shrinkage values than when the first stage temperature is between 130° and 150° C. When the first stage temperature is above 150° C., the film usually breaks. Even if it does not break, the softening point of the film is too closely approached, and the crystallites apparently begin to melt, causing the film to lose those characteristics which depend on oriented crystallinity.

The second, or partially relaxed, stage of the present treatment is conducted at a temperature above 100° C., to be sure to release the internal stresses adequately, but not within 20 degrees of the first stage temperature. The latter condition is established because, as shown in the preceding table, the higher the temperature, the greater the shrinkage, and there is the dual necessity to retain as great an area of treated film as possible and to provide a treated film having the maximum crystalline orientation. When the first stage temperatures are continued into the second stage, this condition is not met adequately. The success of the invention depends on the discovery that the necessary and desired stability is attained at the lower temperature without the undue shrinkage encountered at the higher temperature.

In batchwise operation, the invention is applied to cut film mounted in tentering frames, the clamps of which may be adjusted either to hold the film securely or to permit slippage while still preventing wrinkling of the film. Various forms of continuous strip-handling apparatus may be employed in continuous operation, but the apparatus employed is not a part of the present invention.

The following examples illustrate the practice of the invention:

*Example I*

The film to be treated contained a copolymer of about 90 per cent vinylidene chloride and 10 per cent vinyl chloride which was plasticized with 7 per cent of its weight of di-(alpha-phenylethyl)ether. The film had a nominal thickness of 2 mils. Several samples of the film were placed in adjustable embroidery hoops, which were tightened to prevent slippage. The assemblies were heated to 150° C. in an oven in which the air was initially at about 160° C., for 1 minute. The hoops were then loosened just sufficiently to allow slippage but not enough to permit wrinkling of the film, and the films were again heated for 1 minute at a film temperature of about 120° C. The films were then cooled quickly while still held tightly in the clamping rings, and were removed from the rings at room temperature. The clamped edges were removed, and the center discs were found to lie flat, to have a higher tensile strength than the untreated film, and to have average residual shrinkage values (100° C. for 30 minutes) of 1.21 per cent along the original longitudinal axis of the film and of 0.99 per cent transverse thereto. In all but two samples, these values were 1.1 and 0.55 per cent, respectively. In contrast, a like number of samples of the same film were heated in the same hoops under full restraint for 2 minutes at 150° C. and were then cooled and released. These films, after trimming, were badly wrinkled, showed no material improvement in strength, and had average residual shrinkage values of 1.8 and 2.11 in the same respective directions.

*Example II*

Samples of 10 commercial films of the same composition and thickness as those employed in the preceding example were heated under restraint in the same type of hoops for 1 minute at a film temperature of 150° C. and then for 1 minute at a film temperature of about 125° C. under just enough restraint to prevent wrinkling. The cooled samples had residual shrinkage values (100° C., 30 minutes) of the order of 1.0–1.4 per cent along the original longitudinal axis of the film, and of 0.4–1.2 per cent transversely thereto. The ten samples had average tensile strengths of 17.0 and 37.0 pounds per inch of width, measured longitudinally and transversely, respectively, and showed elongation values in these directions averaging 48.0 and 34.2 per cent, respectively. Other samples of the same 10 films, not subjected to any heat treatment, had corresponding strengths of 13.6 and 24.2 pounds per inch of width, and corresponding elongation values of 51.6 and 30.7 per cent. In addition to providing wrinkle-free films which are dimensionally stable at temperatures at least as high as 100° C., it has been found that the present method overcomes another objectionable and troublesome property of the oriented, crystalline vinylidene chloride-vinyl chloride copolymer films. It has been observed that adhesives which are employed to seal many types of film packages commonly contain solvents which at least soften the film to which they are applied. Such adhesives have caused severe wrinkling of the usual films of crystalline vinylidene chloride-vinyl chloride copolymer. When such film has been treated in accordance with the present invention, however, such solvent type adhesives do not cause the film to wrinkle. Apparently the redistribution of internal stresses during the heat treatment is not limited in its benefits to films which are again heated to elevated temperatures, but is of advantage wherever wrinkle formation has been a problem.

The herein described method may be applied to the treatment of oriented crystalline filaments of the copolymers of vinylidene chloride with vinyl chloride, to reduce the residual shrinkage values of such filaments to values of the order of 1.5 per cent or less. The same conditions of time, temperature, and tension apply to filaments as have been described with respect to films.

The heat treatment has been described as being conducted with the film in a medium of air, but it is to be understood that other heating means may be employed, including other hot gases, steam and other vapors, and that solid heating surfaces may be used. If desired, the heat treatment may be effected with hot non-solvent liquids. The use of heating means other than air may make desirable slight changes of the temperature of the heating medium to give the same film temperatures, though the recited relationship between first and later stage temperatures will still hold true. Because of the low rate of heat transfer between air and these films, it has been found desirable to have oven temperatures about 10 degrees higher than the desired film temperature.

I claim:

1. The method which comprises heating a thin, oriented crystalline article of a copolymer of vinylidene chloride and vinyl chloride to a temperature from about 20 to about 40 centigrade degrees below the softening point for from ½ to 2 minutes while holding the article securely to prevent shrinkage, releasing the tension sufficiently to allow the article to slip but not enough to permit it to wrinkle or curl while heating for an additional ½ to 2 minutes at a lower temperature at which the untreated and unrestrained article would shrink and wrinkle, which temperature is at least as high as that at which dimensional stability is desired but at least 20 degrees below the temperature employed in the first stage of the treatment, cooling the article and releasing the so-formed wrinkle-free product, which still exhibits crystalline orientation and which has a residual shrinkage of less than about 1.5 per cent when reheated for 30 minutes in an unrestrained condition to the said temperature at which dimensional stability is desired.

2. The method which comprises heating a film of a crystalline copolymer of vinylidene chloride and vinyl chloride, having preferred orientation of the crystallites in layers parallel to the surfaces of the film, to a film temperature from 130° to about 150° C. for from ½ to 2 minutes, while holding the film securely to prevent shrinkage, releasing the tension sufficiently to allow the film to slip but not enough to allow it to wrinkle while heating for an additional ½ to 2 minutes at a temperature between 100° C. and 20 degrees below the temperature used in the first treatment, cooling the film at least to below 100° C., and releasing the so-formed wrinkle-free product which has a residual shrinkage of less than about 1.5 per cent when heated in an unrestrained condition at 100° C. for 30 minutes.

3. The method as claimed in claim 2, wherein the film subjected to treatment is composed of a plasticized copolymer of from 88 to 93 per cent vinylidene chloride and complementarily from 7 to 12 per cent vinyl chloride.

CARROLL R. IRONS.

REFERENCES CITED

The following references are of record in the file of this patent:

UNITED STATES PATENTS

| Number | Name | Date |
|---|---|---|
| 2,301,222 | Minich | Nov. 10, 1942 |
| 2,325,060 | Ingersoll | July 27, 1943 |
| 2,344,511 | Harder | Mar. 21, 1944 |